(12) United States Patent
Wynn

(10) Patent No.: US 10,900,463 B2
(45) Date of Patent: Jan. 26, 2021

(54) WAVE POWERED PUMP

(71) Applicant: Nicholas Patrick Wynn, Redwood City, CA (US)

(72) Inventor: Nicholas Patrick Wynn, Redwood City, CA (US)

( * ) Notice: Subject to any disclaimer, the term of this patent is extended or adjusted under 35 U.S.C. 154(b) by 96 days.

(21) Appl. No.: 16/442,123

(22) Filed: Jun. 14, 2019

(65) Prior Publication Data

US 2020/0392935 A1    Dec. 17, 2020

(51) Int. Cl.
*F03B 13/20*    (2006.01)

(52) U.S. Cl.
CPC ........ *F03B 13/20* (2013.01); *F05B 2220/706* (2013.01); *Y02E 10/30* (2013.01)

(58) Field of Classification Search
CPC .... F03B 13/20; F05B 2220/706; Y02E 10/30; Y02E 10/38
See application file for complete search history.

(56) References Cited

U.S. PATENT DOCUMENTS

| | | | |
|---|---|---|---|
| 3,928,967 A | 12/1975 | Salter | |
| 4,289,455 A | 9/1981 | Comyns_Carr | |
| 2010/0101474 A1* | 4/2010 | McEvoy | F03B 13/18 114/230.24 |
| 2012/0013126 A1* | 1/2012 | Molloy | F03D 9/32 290/53 |
| 2017/0037828 A1* | 2/2017 | Haaheim | B63B 35/44 |
| 2019/0048846 A1* | 2/2019 | Hochstein | H02K 5/225 |

FOREIGN PATENT DOCUMENTS

| | | |
|---|---|---|
| FR | 2971558 A1 | 8/2012 |
| WO | WO2013074018 A1 | 5/2013 |

* cited by examiner

*Primary Examiner* — Michael C Zarroli

(57) ABSTRACT

A device for pumping water and powered by ocean waves, a wave farm including multiple devices and a process for capturing energy from waves in the form of hydraulic power. The floating device pitches in waves and includes one or more water filled coiled pipes, connected via valves to feed and discharge manifolds and to a hydraulic accumulator.

18 Claims, 8 Drawing Sheets

WAVE POWERED PUMP

BACKGROUND

The amount of energy in the oceans is huge. A large fraction of the ocean surface is moving and this extends far below the surface, especially for long wavelength waves, often referred to as ocean swells. In ocean waves, the principal water movements are oscillations with periods of 5-15 seconds. For example, an ocean wave with a period of 12 seconds and a wave height of 3 meters transmits an energy flux of around 54 kW per meter of wave-front length. Ocean waves are irregular, but commonly represented as a combination or spectrum of regular waves, as in a Fourier series. Various standard spectra are used to represent real waves, allowing numerical modelling of wave energy capture devices to predict their performance in different sea states.

Many devices operating on diverse principles have been proposed for extracting energy from ocean waves. These devices are often categorized as follows: i) point absorbers—devices moved by waves and having a principal dimension relatively small compared to the wavelength; (ii) oscillating water columns—partially submerged structures that enclose a column of air above a column of water; a collector funnels waves into the structure below the waterline, causing the water column to rise and fall; this alternately pressurizes and depressurizes the air column, pushing or puffing it, through a turbine; (iii) overtopping devices—partially submerged structures; a collector funnels waves over the top of the structure into a reservoir; water runs back into the sea from this reservoir through a turbine; (iv) attenuators—devices with a principal axis oriented parallel to the direction of the incoming wave that convert the energy due to the relative motion of the parts of the device as the wave passes along it; (v) other-devices that do not belong in any of the preceding four categories. Devices in all these categories are known and described in a multitude of publications and many have been operated for testing purposes or as demonstration prototypes. Devices in all categories except (iii) have been proposed with hydraulic mechanisms in their power take off systems, i.e. the device pumps water or hydraulic fluid as a final or intermediate step in capturing power from ocean waves. In all categories, devices that are attached to the seabed to provide reaction forces have been proposed and demonstrated. Other devices float freely but are moored to substantially maintain their position in the ocean. These devices typically contain multiple parts that are moved in relation to each other by wave action.

Capturing energy from ocean waves is a challenge in large part because the open ocean, where wave energy is at a maximum, is a harsh and unforgiving environment. Wave energy capture devices (WEC's) must operate reliably for long periods unattended, must resist corrosion and need to be designed to withstand infrequent but powerful storms. Devices that are tied to the seabed are subject to huge forces unless special measures are taken to mitigate storm loadings. They must also be engineered to adapt to sea level change caused by tides. Free-floating devices that contain multiple moving parts are subjected to violent motion that can tear them apart unless the extreme movements that would occur in storm conditions are restrained. Designing and building such devices to survive in extreme conditions increases their complexity, reduces reliability and raises cost, often to a point where the devices become uneconomical.

Many devices that pitch or roll in the waves have been proposed to capture energy. In U.S. Pat. No. 3,928,967, Salter proposed one or more nodding "ducks" that oscillate about a shaft parallel to the incoming wave-front. Power is extracted from the motion of the ducks relative to the shaft, for example by rotary pumps. In U.S. Pat. No. 4,423,334, Jacobi describes an inverted pendulum in a buoy, with motion of the pendulum relative to the buoy body being restrained by electromagnetic induction, generating electrical power. In U.S. Pat. No. 8,614,521, Babarit describes a device in which a pendular wheel oscillates inside a pitching vessel, with the added feature that the motion can be blocked or latched at certain times to optimize energy capture by the device. All these devices include mechanical components that move relative to one another due to wave action, with the motion being resisted by the power take off system. Such devices require mechanical components and bearings designed to withstand considerable forces in storm conditions. Bearings not only require lubrication and maintenance, they also require that the structure, as well as the component being supported by the bearing, be designed to accommodate the high point loads and stress concentrations arising at the bearing location.

SUMMARY OF THE INVENTION

The invention disclosed below can be used to capture ocean wave energy while avoiding the problems outlined above. Neither rigid edifices attached to the sea floor nor articulating floating structures are required. The device consists of a single, floating, moored body. Forces and loadings generated during power capture are inertial only, manifested as low or moderate hydraulic pressures and distributed over the fluid masses which in turn are distributed inside the device. No bearings are necessary and pressure loads are easily limited below design values using conventional pressure relief valves. The only moving parts are valves, widely available, proven, reliable and very low maintenance.

The invention includes a device able to capture wave energy by pumping water and a method of capturing such energy using the device.

In a basic embodiment, the device comprises a floating body that pitches in ocean waves, with at least the following components rigidly attached in or to the body:
  (a) one or more coiled pipes, filled with water, attached to the body such that the coil axes are generally aligned with the body's pitching axis;
  (b) piping to connect each end of each coiled pipe to both a feed and a discharge pipe;
  (c) valves that can prevent backflow of water from the discharge pipe through the pipe coil(s) to the feed pipe;
  (d) a hydraulic accumulator to provide a constant back pressure in the discharge pipe by evening out fluctuations in flow downstream of the accumulator.

The pitching body, including the above components, has a shape and weight distribution to float stably in water and has a smooth and convex hull profile, facilitating pitch motion. The pitching body is moored to maintain both its general position and particularly its orientation with respect to the incoming wave direction.

The hydraulic power generated by the pumping action may be exported from the device by providing flexible hose connections to feed and discharge lines external to the device. Alternatively the hydraulic power may be used to power additional equipment installed in the device, for example a hydraulic turbine or motor to generate electricity or to power a desalination process.

In another aspect, the invention is a process for extracting energy from waves. In a basic embodiment of this aspect, the process includes the following steps:
(a) providing a body that can float and pitch in waves and attaching thereto a pipe coil, such that its axis is aligned with the pitching axis of the body;
(b) installing in or attaching to the body, valves, a feed and discharge pipe and a hydraulic accumulator, whereby the valves connect each end of the pipe coil to both feed and discharge pipes, such that back flow from the feed pipe through the pipe coil to the discharge pipe can be prevented, and installing the hydraulic accumulator in the discharge pipe;
(c) filling the pipe coil with water and mooring the body in a location that is subject to wave action, such that is oriented with the body's pitching axis parallel to the wave-front, enabling it to pitch in the waves;
(d) providing low pressure water to the feed pipe and taking higher pressure water from the discharge pipe.

DETAILED DESCRIPTION OF THE INVENTION

The invention includes a device and an array of devices for generating power from waves, and a method of generating power from waves, principally hydraulic power in the form of pumped water. The device includes a floating body, with a hull shape amenable to pitching in ocean waves and one or more coiled pipes, filled with water, installed in and rigidly attached to the floating body.

Figure 1:
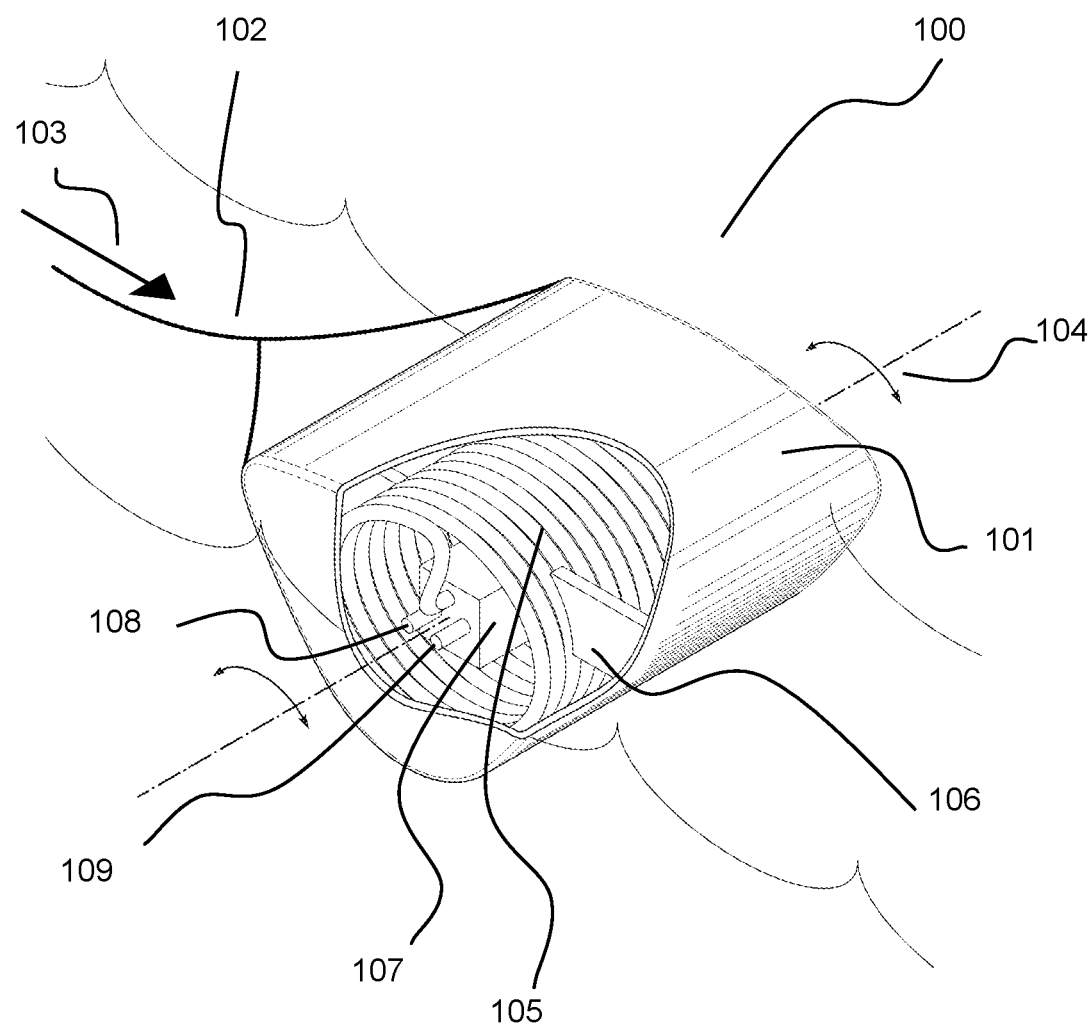
FIG. 1 shows a cutaway representation of a slack moored embodiment of the device, including a floating body with attached pipe coil, valves, hydraulic accumulator and feed and discharge pipes.
Figure 2:
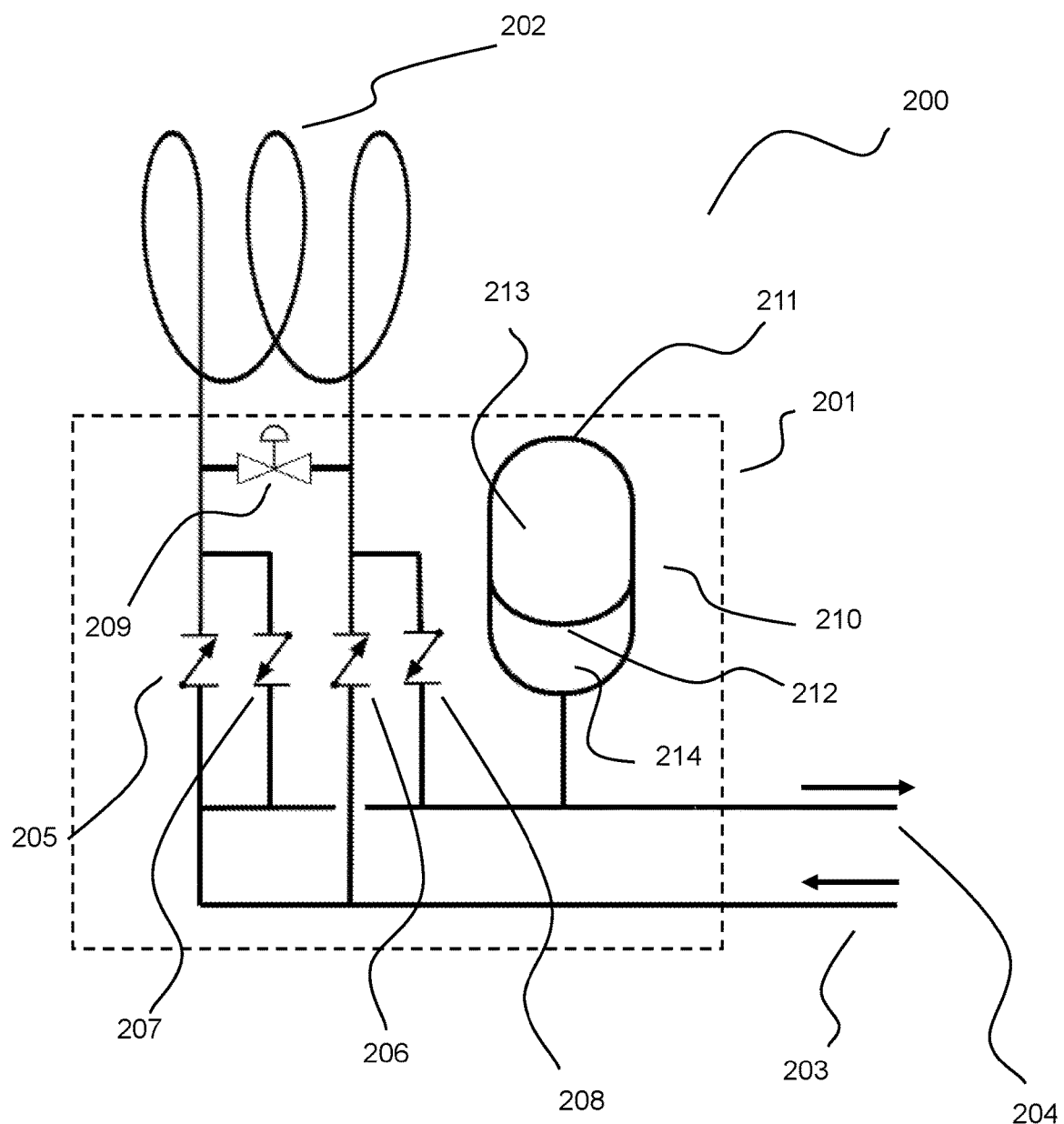
FIG. 2 shows a schematic embodiment using a motorized valve to connect pipe coil ends and non-return valves to connect pipe coil ends with feed and discharge pipes, with the discharge pipe connected to a hydraulic accumulator.

FIG. 1 shows a cutaway representation of the device, showing significant elements in simple form. It will be apparent to those of skill in the art that additional elements and features may be included within the scope of the invention, as may modifications to the elements shown that do not alter the device materially. The device, generally indicated by numeral 100, includes a floating body with a hull shape amenable to pitching in waves, 101, with a mooring line and bridle, 102, attached so the body maintains an orientation with respect to the incoming wave direction, 103, such that its pitching axis, 104, is perpendicular to the incoming wave direction. A coiled pipe filled with water, 105, is installed in and rigidly attached to the floating body using suitable means, 106, such that the axis of the pipe coil is generally aligned with the pitching axis of the floating body. An enclosure, 107, is located inside the coil near the pitching axis and contains a feed pipe manifold, 107, and a discharge pipe manifold, 108, which are connected to both ends of the pipe coil using a valve arrangement as shown in FIG. 2. The enclosure, 107, serves only to indicate the general location of other components within it as described below.

A variety of hydrodynamic modelling tools used in the marine industry are available to predict the pitching motion of a body of known hull shape and mass distribution. When designing the device, these parameters need to be set such that the natural pitching period of the body, with all components installed and ready for operation, is in the same range as the wave periods in the most common sea states in which the device is deployed. The correct orientation of the body in the wave field is most easily achieved by using a bridle, either attached to the up-wave end of the body, or to arms that pivot in a vertical plane about the pitching axis of the body. The slack moored device depicted in FIG. 1 would typically be moored to a buoy, anchored to the seabed up-wave from the device.

FIG. 2, generally indicated by numeral 200, shows schematically the components that are in the enclosure, 201, and how they are connected to the pipe coil, 202, and feed pipe manifold, 203, and discharge pipe manifold, 204. Each end of the pipe coil is connected to the feed pipe manifold, 203, by non-return valves, 205 and 206, which prevent water passing back into the feed pipe manifold. Each end of the pipe coil is also connected to the discharge pipe manifold, 204, by non-return valves, 207 and 208, which prevent water from passing from the discharge pipe manifold back into the pipe coil. A motorized valve, 209, connects the two ends of the coil, allowing water to circulate freely inside the coil when the valve is opened, facilitating wave-to-wave control to maximize power capture in irregular waves, as described below and illustrated in FIGS. 7 through 9. A hydraulic accumulator, 210, is installed on the discharge pipe manifold, to reduce pressure variations resulting from pulsating flow. Any suitable hydraulic accumulator can be used. One suitable type is shown schematically and comprises a pressure vessel, 211, with a membrane, 212, separating a pressurized gas volume, 213, from a water volume, 214, which is connected directly to the discharge pipe manifold.

When the device pitches in ocean waves, a significant component of its motion is the angular oscillation about its pitching axis. This oscillatory motion includes a periodic angular acceleration of the water held in the pipe coil, which generates a hydraulic pressure fluctuation at alternate ends of the pipe coil. A coil with multiple loops is used in the invention in order to generate higher pressures than can be achieved with a single loop. By connecting each end of the coil with a feed and discharge pipe manifold, as described above, the pressure fluctuations can be used to pump water from the feed manifold to the discharge manifold, against the back pressure maintained by the hydraulic accumulator. The water in the coil is restrained by closed non-return valves from moving relative to the coil until the pressure at one end of the coil reaches the back pressure in the discharge manifold. When this occurs, the non-return valves open and water then moves independently of the coil motion, except for minor frictional effects. The water is accelerated away from the discharge manifold by the back pressure, but the device body with attached coil, still accelerating, moves faster, leaving the water behind to pass into the discharge manifold. This pulse of water persists until the relative motion between coil and water content ceases, at which point the non-return valves close. Energy, transferred from the ocean waves by the pitching motion, is thus converted to usable hydraulic power.

Figure 3:
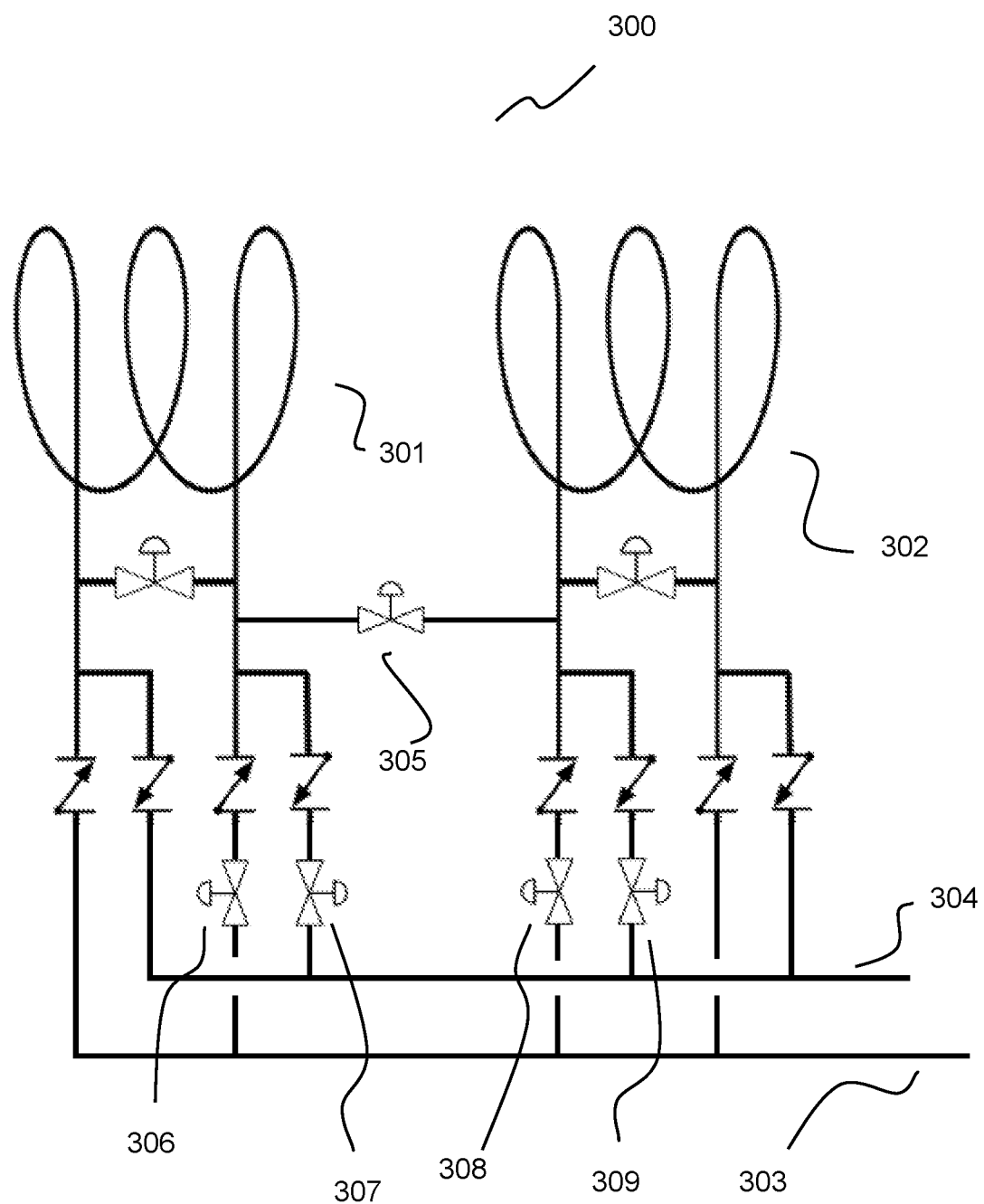
FIG. 3 shows a schematic embodiment with two pipe coils, connected either in parallel or in series between the feed and discharge pipes, using motorized valves.
Figure 4:
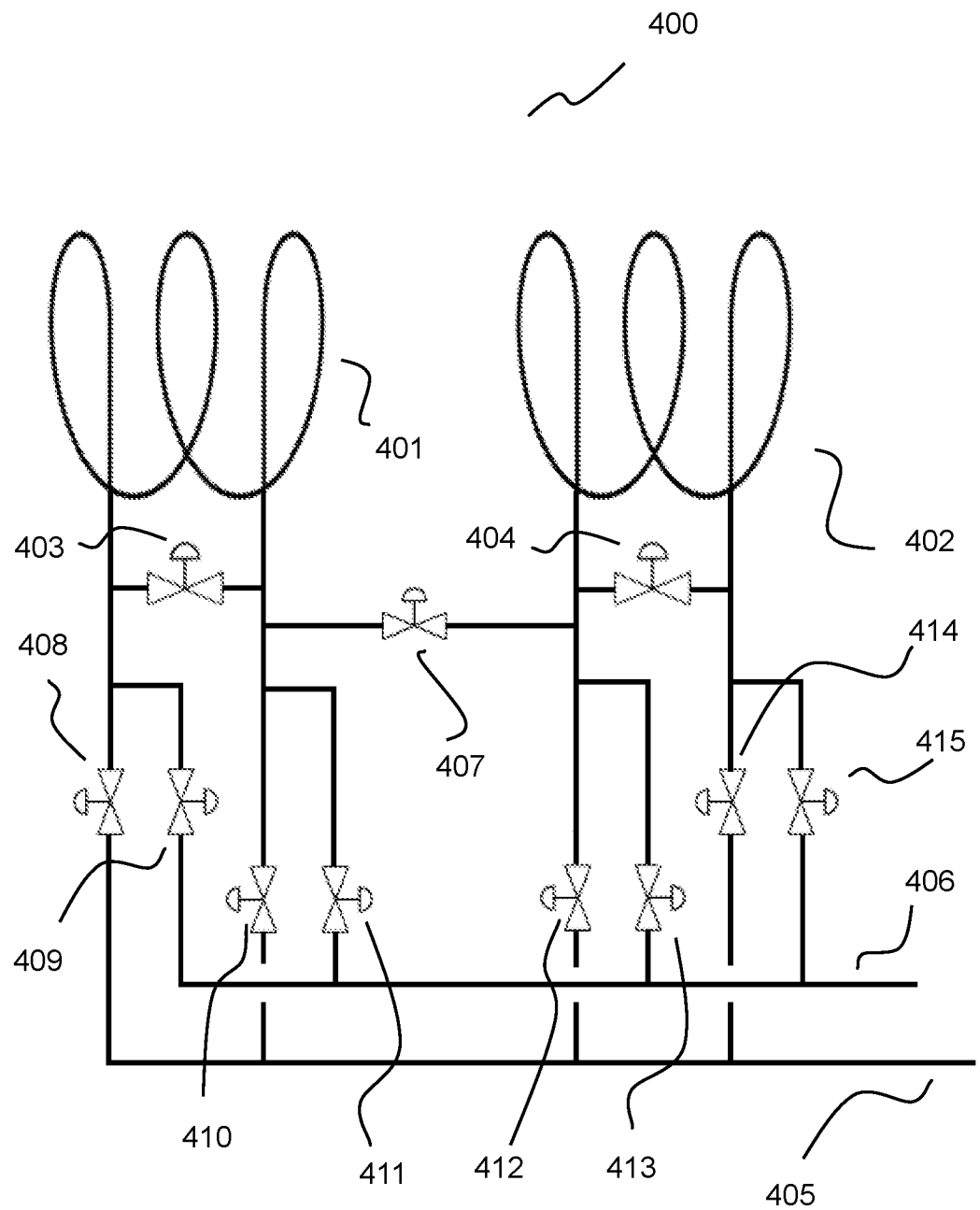
FIG. 4 shows a schematic embodiment with two pipe coils using motorized valves.

FIG. 3, generally indicated by numeral 300, shows schematically an alternative valve arrangement in which two pipe coils, 301 and 302, with non-return valves connecting them to feed manifold, 303 and discharge manifold 304 as described for FIG. 2, are switched between parallel operation and series operation using motorized valves. Configuring the device with coils switched in series (with valve 305 open and valves 306, 307, 308 and 309 closed) captures the same energy as when the coils are switched in parallel (with valve 305 closed and valves 306, 307, 308 and 309 open), but the device will pump less water at a higher pressure. This feature allows the device to be trimmed to operate in high and low amplitude waves, yet generate essentially the same pressure in both situations. FIG. 3 and FIG. 4 described below, show only two pipe coils, however a large device can be equipped with many more individual pipe coils and associated valves, providing further operational flexibility to suit different wave conditions.

FIG. 4, generally indicated by numeral 400, shows schematically a valve arrangement in which two pipe coils, 401 and 402, with bypass valves, 403 and 404, can be connected to feed manifold 405 and discharge manifold 406 using motorized valves 407, 408, 409, 410. 409, 411, 412, 413, 414 and 415, enabling either parallel or series operation. In this arrangement the non-return valve functionality is provided by actuating the valves connecting the pipe coils to the feed and discharge manifolds using a control unit, informed by pressure sensors, all located in the device. This arrangement also allows the water in individual coils to be locked in place, immediately changing the pitching response of the device to optimally capture energy from irregular waves.

Figure 5:
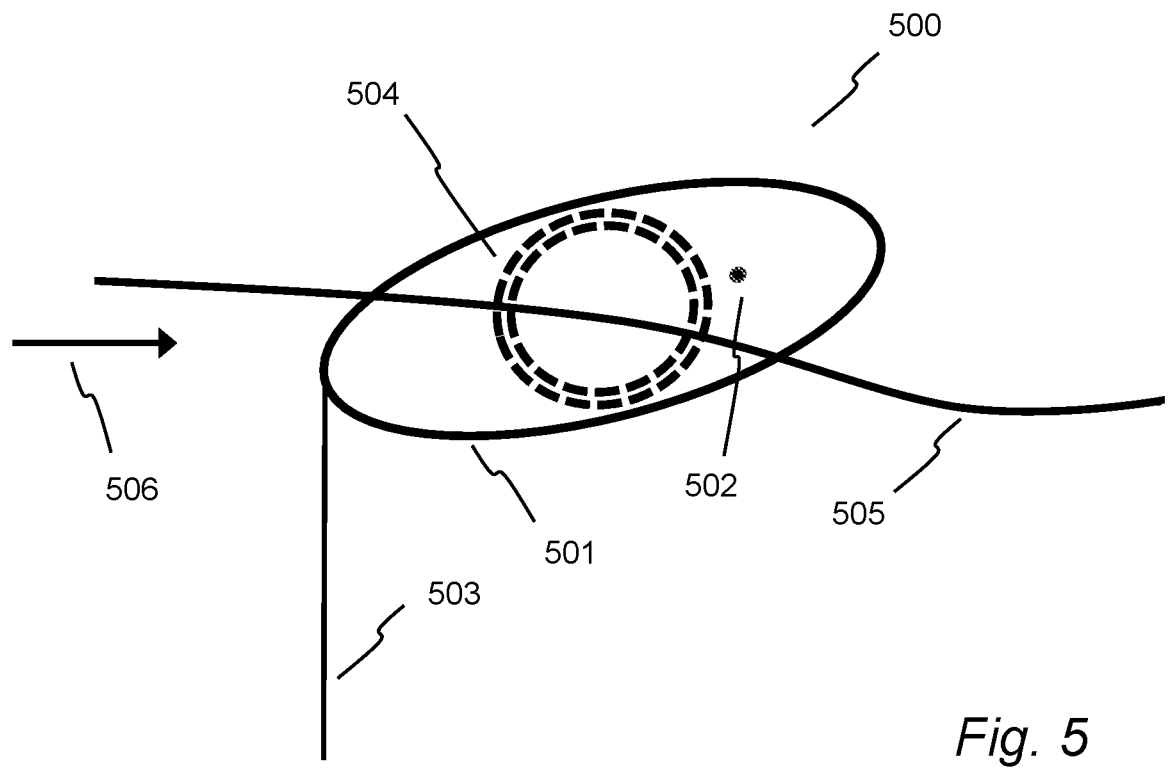
FIG. 5 shows schematically and viewed parallel to the wave-front, a simplified cross section of a pitching device with a taut mooring.

FIG. 5 shows schematically an alternate mooring arrangement for a pitching body, 500, consisting of a hull form suitable for pitching, 501, with an offset center of gravity, 502. with one end of the device connected by a taut-mooring, 503, to the seabed. The taut mooring is arranged such that the device is oriented with the axis of the water-filled coil, 504, perpendicular to incoming waves, 505. The wave direction is indicated by the arrow, 506. This arrangement can capture more power than a slack mooring, since a substantial force is exerted on the mooring line during the heave portion of the wave cycle, generating a strong angular acceleration. The rotation and acceleration are reversed when the wave falls. This higher energy capture achievable with this mooring type must be weighed against additional costs for the mooring and other drawbacks, for example the need to design for tidal height variations. Device location is the key factor in determining the best mooring arrangement.

Figure 6:
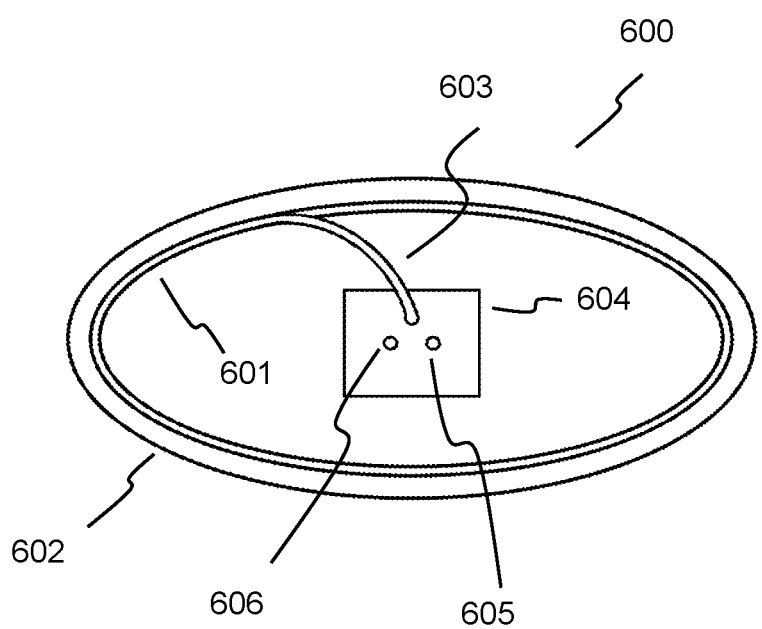
FIG. 6 shows schematically and viewed parallel to the wave-front, a simplified cross section of a pitching device with a non-helical coil, fixed adjacent to the vessel hull.

FIG. 6 generally indicated by numeral 600, shows a cross section of a device with an alternate shape for the coils. Instead of helical coils, the pipe routing of the water-filled coil, 601, follows the periphery of the hull, 602, in this case elliptical. The coil ends, 603, pass into a valve enclosure, 604, which houses valves and hydraulic accumulator, connecting to a feed manifold, 605, and discharge manifold, 606, as in previous examples. Locating the water-filled coil piping close to the device periphery enhances device performance by providing a higher moment of inertia of the coil water about the pitching body's axis. A disadvantage of closely following the hull periphery is that the water flow path is more tortuous, resulting in a greater pressure loss from friction as water moves back and forth in the pipe coils. A compromise coil shape is optimum, where sharp turns which restrict flow are avoided, but close to the hull so as to provide a greater moment of inertia than with a helical coil.

Numerical modelling of the device shows clearly that for optimum performance, the moment of inertia of the water in the pipe coils should constitute a large fraction of the moment of inertia of the complete device; at least half and preferably two thirds. This requires that, consistent with the hull shape, the mean diameter of the pipe coils be as high as possible and that the combined mass of pipe material and device hull is lower than the weight of water in the pipe coils. One of many suitable structural materials for both piping and hull is carbon fiber reinforced epoxy resin, combining high tensile strength with low weight. Using such material, pipe coils and hull can be fabricated as a single integral structure with rectangular cross section pipe.

Figure 7:
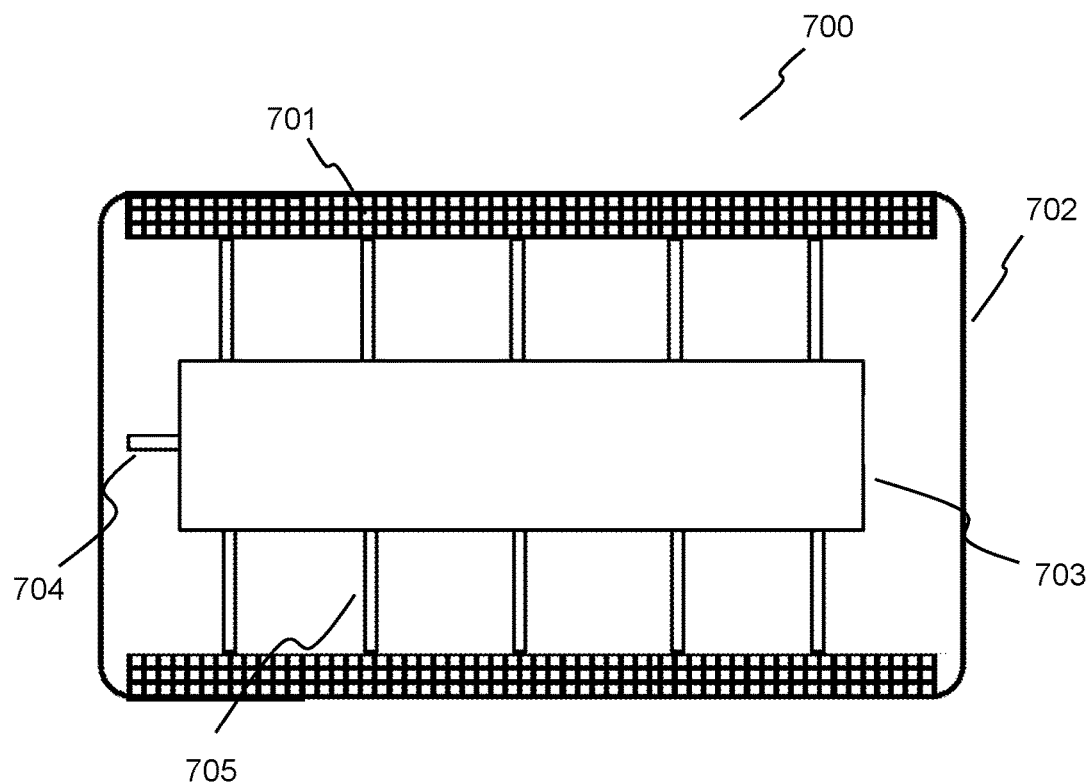
FIG. 7 shows schematically a cross section of a device with an integral hull and coil construction, viewed in the direction of the wave, i.e. perpendicular to the wave-front and coil axis.

FIG. 7 shows schematically a cross section of a device, 700, with such an integral hull and coil construction, looking in the direction of the wave, i.e. perpendicular to the wave-front and coil axis. In this example five coils span the whole beam of the device and are arranged symmetrically in three concentric layers, 701, the outermost layer comprising also the hull skin. The hull profile closer to the pitching axis, 702, has no coils attached. As previously disclosed, coil ends are connected by valves inside the enclosure, 703, to feed and discharge manifolds, 704, by coil pipe extensions, 705. Heavy components such as valves and the hydraulic accumulator, shown collectively by the enclosure, 703, are located close to the pitching axis. This construction combines a strong, rigid, lightweight hull with suitable flow channels for the water being pumped. It provides one way of building a pitching body with a high fraction of its moment of inertia generated by water mass inside the coils, as preferred for the invention.

Figure 8:
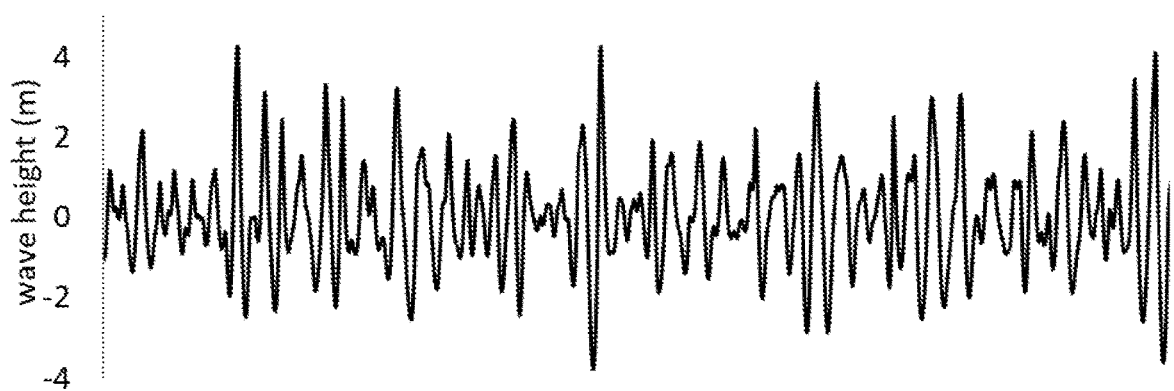
FIG. 8 shows a five hundred second excerpt of a JON-SWAP irregular wave spectrum.

FIG. 8 shows a 500 second excerpt from a 67 minute duration wave profile with a peak wave period, $T_p$,=11.54 seconds and a significant wave height, $H_s$,=5.36 meters. The irregular wave spectrum (IWS) used is the Joint North Sea Wave Observation Project (JONSWAP) standard. The JONSWAP spectrum is especially irregular since the waves are not fully developed and was therefore chosen to illustrate with numerical modelling how, with multiple coils as per the invention, the device response can be adapted in irregular waves to maximize energy capture. The numerical modelling was based on previously measured pitching characteristics of a specific hull shape with specific ballasting.

The device modeled has a length of 27 meters and a beam (parallel to the wave-front and coil axis) of 30 meters. The pipe coils are helical and, in order to maximize the moment of inertia of the contained water, are distributed over the complete beam of the device, as well as concentrically. The mean pipe coil diameter is 15 meters. The numerical model includes established pipe flow friction coefficients, allowing determination of frictional losses. These losses, from water oscillations in the pipe coils, are higher with small diameter pipes than with large diameter pipes. Because more coil turns can be accommodated with smaller diameter pipes, allowing pumping at higher pressures, there is a tradeoff between the pumping pressure and the energy recovered, i.e. that which is not dissipated due to pipe friction. By way of example, two design cases show this effect. Both design cases include 12 individual coils, arranged in six switchable pairs, port and starboard, avoiding port/starboard asymmetry in moment of inertia when coil pairs are activated. In Design A the pipe internal diameter is 600 mm, each coil has 10 turns and the pipe length per coil is 460 meters. In Design B the pipe internal diameter is 400 mm, each coil has 22 turns and the pipe length per coil is 1037 meters. Design A pumps at an average pressure of 3 bar and Design B at 6 bar. The modelling indicates a frictional loss with Design A of 18% of the captured energy and 25% with Design B. Both these designs therefore release the bulk of the energy captured by device pitching as usable hydraulic power.

Maximizing the energy captured by device pitching in irregular waves is accomplished by actuating valves as described below. Referring again to FIG. 4 as an example configuration, valves can be actuated to set each coil or coil pair into one of three operational modes: (i) freewheeling, (ii) locked or (iii) pumping.

In the freewheeling mode, valves 403 and 404 are open and the eight valves connecting the coils to feed and discharge manifolds, valves 408 through 415, are closed. As the device pitches, water oscillates inside the coils, despite modest frictional resistance to motion. There is no inertial resistance to device motion from the water in the freewheeling coils so the natural pitching period of the device is low and can be well below the typical wave period. How much lower depends on the number of coils or coil pairs switched to freewheeling mode.

In the locked mode the eight valves connecting the coils to the feed and discharge manifolds remain closed. Valves 403 and 404 are also closed, thus locking the inertial mass of the water and increasing the natural pitching period of the device, the increase depending on how many coils or coil pairs are in the locked mode.

In the pumping mode, the valves connecting to the appropriate manifold are activated by a control unit, informed by pressure sensors indicating pressure difference between the coil ends. They can be controlled to open when the pressure difference exceeds the header back pressure and to close when the pressure difference goes to zero as flow ceases, providing the same result as the non-return valves in FIG. 2. In pumping mode, the effective moment of inertia of the device and resulting natural pitching period change when the valves open and close. When valves open and water flows from the feed manifold through the coils into the discharge manifold, there is no inertial effect of coil water on device motion. When the valves close to prevent flow reversal, the moment of inertia of the body includes that of the water shut in the coil. A control system can actuate valves to switch device operation between the above modes to maximize energy capture in irregular waves. Switching from locked mode to freewheeling mode reduces the moment of inertia of the pitching body, resulting in a faster response to wave excitation. A control system can exploit this to keep the pitching motion in a phase relationship with the wave action that maximizes energy capture. Switching from freewheeling mode to pumping mode results in the water hammer effect opening the pressure actuated valves, allowing a pulse of water to be pumped from the low-pressure manifold to the high-pressure manifold, even when wave action is relatively modest. Timing the opening of the valves provides additional flexibility in adapting the device response to an irregular wave by changing the duration of each of these states. If the manifold feed valves are not under pressure control, timing the closing of valves is not recommended, due to the possibility of water hammer from the large masses of water moving relative to the coil. Valve closing should only be triggered at the instant this flow ceases.

Many valve types are available on the market and can be used in the device. Ball valves or butterfly valves are especially well suited for motorized valves, since the pressure differences are modest and leak tightness is not critical to device performance. Fast shutoff and opening are more important. Self-actuated non-return valves of the gate type are preferred for the same reasons. Control valve actuation can be hydraulic, using a small fraction of the power produced.

Figure 9:
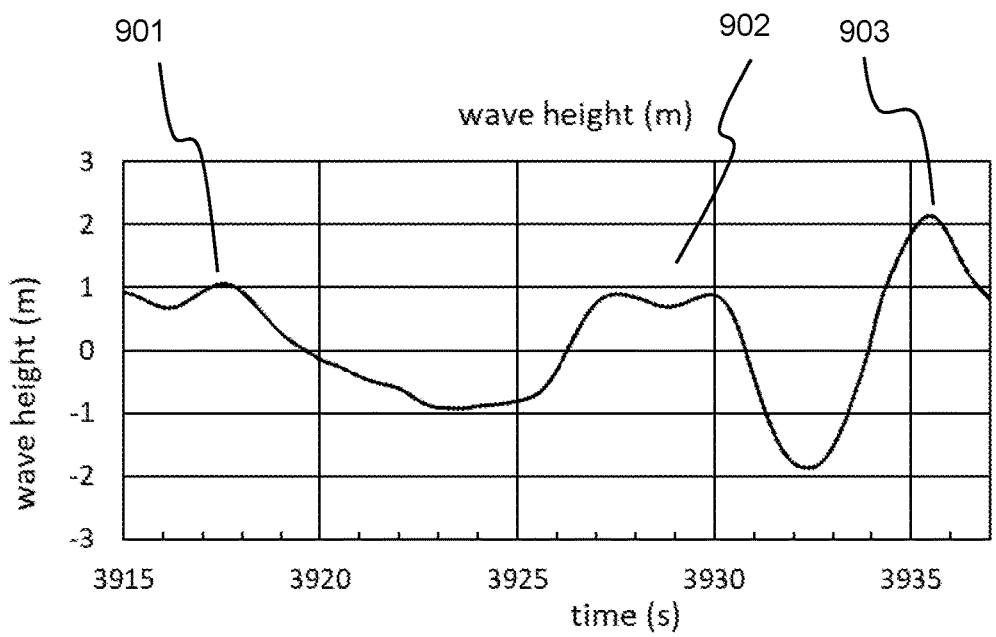
FIG. 9 shows the time variation of wave height in a 22 second excerpt from the JONSWAP spectrum shown in FIG. 7.
Figure 10:
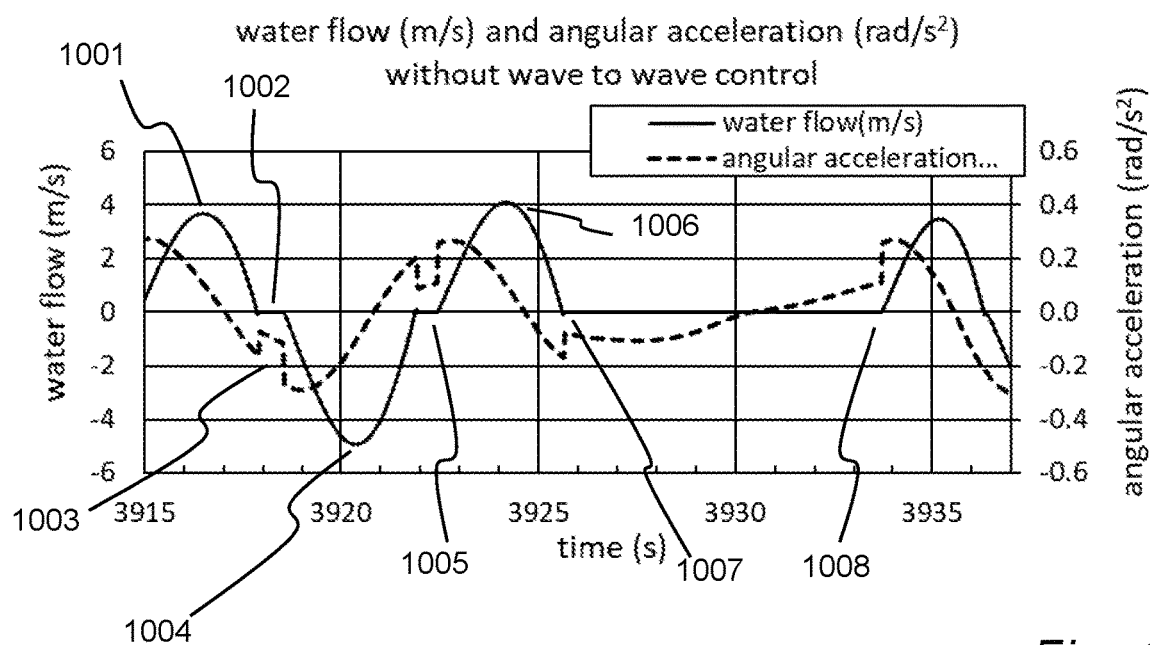
FIG. 10 shows how the device performs in the JONSWAP 22 second wave excerpt, without wave-to wave-control.
Figure 11:
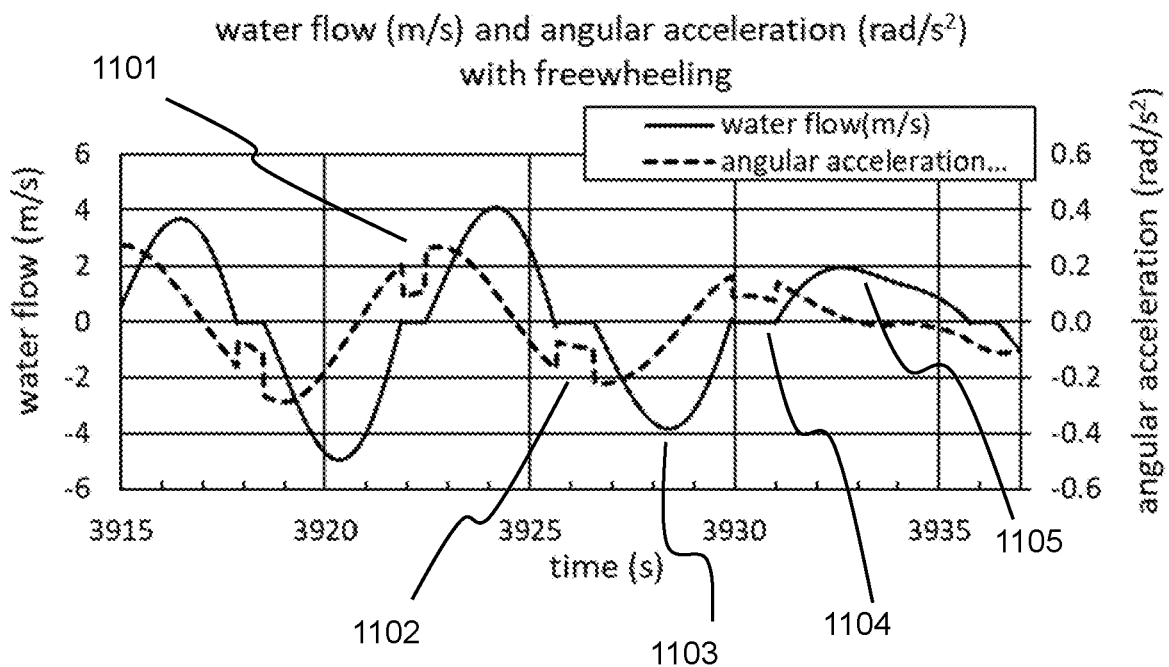
FIG. 11 shows how the device performs in the JONSWAP 22 second wave excerpt, with wave-to wave-control, using freewheeling.
Figure 12:
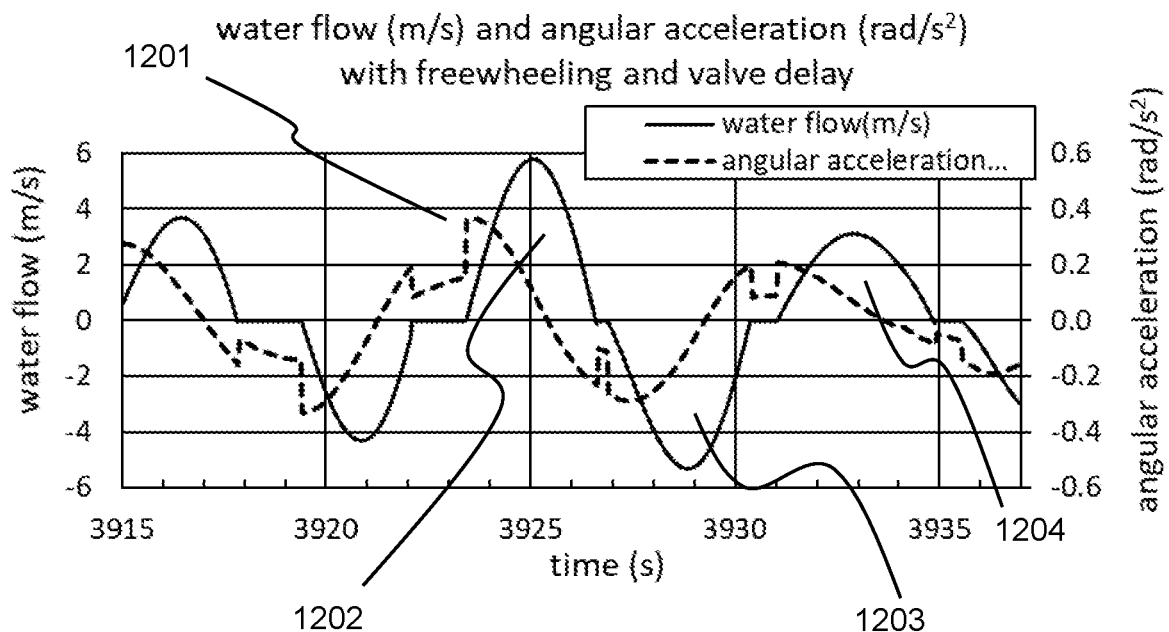
FIG. 12 shows how the device performs in the JONSWAP 22 second wave excerpt, with wave-to wave-control, using both freewheeling and valve timing.

Installing multiple coils, ported via valves to feed and discharge manifolds as described above, provides many ways to modify the effective pitching moment of inertia of the device and thereby provide wave to wave control in irregular waves. FIG. 9 shows the time variation of wave height in a 22 second excerpt from the JONSWAP profile shown in FIG. 8. The excerpt starts with a first wave crest, 901, at time 3917.6 seconds and proceeds through a double wave, 902, cresting at time 3928.5 seconds and finishes with a third wave crest, 903 at time 3935.5 seconds. The time between the first and second crests is 10.9 seconds and between the second and third crests only 7 seconds, so the wave period reduces by 40% from one wave to the next. FIGS. 10, 11 and 12 illustrate the impact of two control modes, using freewheeling to shorten the natural period of the device and using valve timing to lengthen it, to improve pumping power during this 22 second time interval.

FIG. 10 shows how the example device referred to above, Design Case A, with six coil pairs, performs without wave to wave control. In this example, all coil pairs are in pumping mode and the back pressure between discharge and feed manifold is set to a value such that the feed and discharge valves open and the device starts to pump water when the angular acceleration, in either direction, exceeds 0.11 rad/s$^2$. This generates a pressure difference across the pipe coil ends of 3.9 bar, the pressure in the hydraulic accumulator. The valves remain open until the water flow velocity relative to the coil declines to zero, whereupon they close.

The chart in FIG. 10 shows the time variation of the water flow in the pipe coil, per the continuous line, and the angular acceleration of the pitching body, per the dashed line. The sequence starts with the valves open as shown by the water flow in the pipe coil at time 3916.7 seconds reaching a maximum of 3.6 m/s, 1001. The water flow then declines to zero at time 3918 seconds, 1002, whereupon the valve pair connecting the coil to the feed and discharge manifolds closes. When the valves close, the moment of inertia of the pitching body increases and the angular acceleration undergoes a step change from −0.17 rad/s$^2$ to −0.08 rad/s$^2$, 1003. At time 3918.7 seconds, the angular acceleration reaches the threshold of 0.11 rad/s2 and the alternate pair of feed and discharge valves open, allowing a pulse of water to flow in the other direction through the coil, from feed manifold to discharge manifold. The opening of these valves reduces the moment of inertia of the pitching body, causing a step change in its angular acceleration from −0.11 rad/s$^2$ to −0.28 rad/s$^2$. The pulse of water from the other end of the coil reaches a maximum value, 1004, of −5 m/s at time 3920.5 seconds, then declines to zero at time 3922 seconds, 1005, whereupon the valve pair closes. The step change in angular acceleration repeats and water flow in the opposite direction commences when the angular acceleration again reaches 0.11 rad/s2, causing the first pair of valves to open. Water flow peaks at 3924 seconds, 1006, and again declines to zero at time 3925.7 seconds, causing the valve pair to close and the angular acceleration to step down, 1007. But then the process stops, the valve pair set to discharge the next water pulse do not open because the threshold angular acceleration is not reached, so the pump is not active again until 3934 seconds, 1008. Only four pulses of water flow are generated over the time period in the chart.

FIG. 11 shows how wave to wave control of the device using freewheeling can prevent the flow reduction caused by this missing pulse. The figure shows the same variables as FIG. 10, with six coil pairs in pumping mode until time 3924.6 seconds. At this point two of the six coil pairs are switched to freewheeling mode. At time 3929.5 seconds, a further three coil pairs are switched to freewheeling mode. This reduction in moment of inertia makes the device accelerate faster and the threshold acceleration of 0.11 rad/s2 is reached at time 3925.7 seconds, 1102, giving a fourth pulse of pumped water reaching a maximum at time 3928.4 seconds, 1103. The valve pair close again and the alternate pair open at time 3931 seconds, 1104, generating a fifth pulse of water at time 3933 seconds, 1105.

FIG. 12 shows by way of example how timing valve opening can further improve the pumping rate illustrated in FIG. 11, using motorized valves in place of the non-return valves depicted in FIG. 2. Opening a valve pair early, before the threshold acceleration is reached, may allow water to initially flow back from the discharge manifold to the feed manifold. Device motion is then speeded up, not just by reducing the effective moment of inertia but by transferring energy stored in the hydraulic accumulator back to the device. Alternatively, valve pair opening can be delayed past the time when the threshold acceleration is reached, slowing device motion by extending the time when the moment of inertia of the body is at its maximum. This technique is adopted in the control exercised in FIG. 12 to accommodate the initial long wave period of 10.9 seconds between the second and third wave-crests shown in FIG. 9. In FIG. 12, valve opening at around 3923.6 seconds, 1201, has been delayed by 0.9 seconds compared with the opening time of 3922.7 seconds, 1101, in FIG. 11, to resonate better with the initial long wave period. This enables the amount of freewheeling to be reduced compared to that in FIG. 11, yet still generating the fifth pulse of water. This results in even more water being pumped, which can be seen by comparing the water flow pulse areas, 1202, 1203 and 1204 in FIG. 12 with their equivalents in FIG. 11.

In actual deployment, wave to wave control makes use of advance knowledge of the upcoming wave pattern. This technique is well established, such foreknowledge being provided by buoys, equipped with accelerometers, and located up-wave from the wave energy capture device. The data is sent to the device control system in advance of the wave reaching the device, enabling the device to be configured optimally when the wave arrives. The optimal configuration is selected using algorithms that can be periodically or continually updated to improve performance.

The hydraulic power generated by the pumping action may be exported from the device by providing flexible hose connections to teed and discharge lines, external to the device. These hose connections should be located close to the pitch axis and symmetrically on either side of the device. Any impairment of device motion can be further reduced by using coiled hoses, increasing their flexibility.

In a further embodiment, the hydraulic power may be used in the device, by installing further equipment, for example a hydraulic turbine or motor to generate electricity or to power a desalination process. This additional equipment should be located close to the pitching axis, generally in the location indicated as enclosures in the preceding description. This will minimize the moment of inertia caused by the inertial mass of the additional equipment.

I claim:

1. A wave powered pump, comprising:
    (a) a floating body, with a hull form suitable for pitching in waves,
    (b) at least one pipe coil, filled with water, installed in and rigidly attached to the floating body, with the coil axis aligned with the pitching axis of the floating body,
    (c) a mooring arrangement, mooring the floating body such that it is oriented with its pitching axis perpendicular to the wave direction,
    (d) piping that connects each end of the pipe coil to both a feed pipe manifold and a discharge pipe manifold,
    (e) valves which can prevent back flow of water from the discharge manifold through the pipe coil to the feed manifold,
    (f) a hydraulic accumulator, installed in the discharge pipe manifold to even out flow fluctuations.

2. The device of claim 1, wherein the mooring arrangement is a slack line tying the floating body to a floating buoy.

3. The device of claim 1, wherein the mooring arrangement is a taut line, tying the floating body to the seabed.

4. The device of claim 1, wherein the valves preventing back flow are self-actuated non-return valves.

5. The device of claim 1, in which the two ends of a pipe coil are connected through a motorized bypass valve, allowing water to circulate through the pipe coil when the valve is open.

6. The device of claim 1, wherein the valves are motorized on-off valves, actuated by pressure switches or by a control unit.

7. The device of claim 6, in which there are multiple pipe coils, which the valves can connect between the feed and discharge manifolds in either a series flow configuration, or a parallel flow configuration, or in combinations thereof.

8. The device of claim 7, wherein the control unit changes the flow configuration to optimize pumping performance in irregular waves.

9. The device of claim 1, wherein the pipe coils are helical.

10. The device of claim 1, wherein the pipe coils follow the hull profile.

11. The device of claim 10, wherein the pipe coils form an integral part of the hull structure.

12. The device of claim 1, wherein the water in the pipe coils comprises at least 50 percent of the moment of inertia of the pitching body about its pitching axis.

13. The device of claim 1, wherein the feed and discharge manifolds are connected to a turbine or hydraulic motor, installed in the floating body and which drives a generator to produce electric power.

14. A wave farm, comprising a multiplicity of devices according to claim 1, moored together in an array.

15. A process for extracting hydraulic power from waves, comprising:
    (a) providing a floating body, suitable for pitching in waves and installing in and rigidly attaching thereto one or more pipe coils with their axes aligned with the pitching axis of the floating body, connecting each end of the pipe coils to both a feed and a discharge pipe manifold via valves suitable to prevent back flow and installing a hydraulic accumulator in the discharge manifold;

(b) mooring the floating body in water at a location that is subject to wave motion;

(c) filling the coils with water;

(d) supplying low pressure water to the feed manifold and taking higher pressure water from the discharge manifold as the body pitches in waves.

16. The process of claim 15, including connecting the two ends of a pipe coil through a motorized bypass valve, allowing water to circulate through the pipe coil when the valve is open.

17. The process of claim 16, including controlling the valve opening and closing times to enhance the pitching motion of the floating body in irregular waves and thereby increase pumping power.

18. The process of claim 17, including passing the pressurized water from the discharge manifold to a hydraulic turbine or motor, which drives a generator and produces electrical power.

* * * * *